United States Patent
Yabu et al.

(10) Patent No.: US 8,537,498 B2
(45) Date of Patent: Sep. 17, 2013

(54) BASEPLATE FOR DISK DRIVE SUSPENSION AND METHOD FOR MANUFACTURING BASEPLATE

(71) Applicants: NHK Spring Co., Ltd., Kanagawa (JP); Ogaki Seiko Co., Ltd., Gifu-ken (JP)

(72) Inventors: Ryosuke Yabu, Ogaki (JP); Masakazu Sugino, Ogaki (JP)

(73) Assignees: NHK Spring Co., Ltd., Yokohama-Shi (JP); Ogaki Seiko Co., Ltd., Ogaki-Shi (JP)

( * ) Notice: Subject to any disclaimer, the term of this patent is extended or adjusted under 35 U.S.C. 154(b) by 0 days.

(21) Appl. No.: 13/707,100

(22) Filed: Dec. 6, 2012

(65) Prior Publication Data

US 2013/0100556 A1 Apr. 25, 2013

Related U.S. Application Data

(62) Division of application No. 12/767,018, filed on Apr. 26, 2010, now Pat. No. 8,339,745.

(30) Foreign Application Priority Data

May 8, 2009 (JP) .................................. 2009-113619

(51) Int. Cl.
*G11B 21/16* (2006.01)
(52) U.S. Cl.
USPC ....................................................... 360/244.6
(58) Field of Classification Search
USPC ....................................................... 360/244.6
See application file for complete search history.

(56) References Cited

U.S. PATENT DOCUMENTS

| | | | |
|---|---|---|---|
| 5,808,835 | A | 9/1998 | Fujiwara |
| 6,231,698 | B1 | 5/2001 | Braunheim et al. |
| 6,351,349 | B1 | 2/2002 | Braunheim et al. |
| 6,697,224 | B2 | 2/2004 | Wang et al. |
| 6,754,044 | B1 | 6/2004 | Braunheim et al. |

(Continued)

FOREIGN PATENT DOCUMENTS

| | | |
|---|---|---|
| CN | 1423816 A | 6/2003 |
| JP | 62-294130 A | 12/1987 |

(Continued)

OTHER PUBLICATIONS

Chinese Office Action dated Jul. 13, 2011 (and English translation thereof) in counterpart Chinese Application No. 201010177465.6.
Japanese Office Action dated Mar. 5, 2013 (and English translation thereof) in counterpart Japanese Application No. 2009-113619.

*Primary Examiner* — Will J Klimowicz
(74) *Attorney, Agent, or Firm* — Holtz, Holtz, Goodman & Chick, PC (57) ABSTRACT

A cylindrical boss portion is press-formed on a baseplate of a disk drive suspension. The boss portion is penetrated by a ball insertion hole relative to the thickness of the baseplate. The baseplate is formed of stainless steel. A chemically-polished surface is formed on an inner circumferential wall of the ball insertion hole by chemically polishing the baseplate after heat-treating it. The boss portion is inserted into a mounting hole of an actuator arm. A ball having a diameter larger than the inside diameter of the ball insertion hole is passed through the ball insertion hole. As the diameter of the boss portion is enlarged by the ball, the boss portion is fixed to the actuator arm.

1 Claim, 5 Drawing Sheets

(56) References Cited

U.S. PATENT DOCUMENTS

| | | |
|---|---|---|
| 6,780,257 B2 | 8/2004 | Nagata et al. |
| 7,304,824 B2 | 12/2007 | Brink et al. |
| 7,324,307 B2 | 1/2008 | Brink et al. |
| 7,480,982 B2 | 1/2009 | Hosaka et al. |
| 7,673,381 B2 | 3/2010 | Takikawa et al. |
| 8,339,745 B2 * | 12/2012 | Yabu et al. ............. 360/244.6 |
| 2003/0156357 A1 | 8/2003 | Brink et al. |
| 2004/0145830 A1 | 7/2004 | Brink et al. |
| 2005/0099731 A1 | 5/2005 | Brink et al. |

FOREIGN PATENT DOCUMENTS

| | | |
|---|---|---|
| JP | 3-180500 A | 8/1991 |
| JP | 3-193887 A | 8/1991 |
| JP | 9-85888 A | 3/1997 |
| JP | 10-031872 A | 2/1998 |
| JP | 2000-011602 A | 1/2000 |
| JP | 2002-237159 A | 8/2002 |
| JP | 2002-254276 A | 9/2002 |
| JP | 3563037 B2 | 9/2004 |
| JP | 2010262705 A * | 11/2010 |

* cited by examiner

BASEPLATE FOR DISK DRIVE SUSPENSION AND METHOD FOR MANUFACTURING BASEPLATE

CROSS-REFERENCE TO RELATED APPLICATIONS

This application is based upon and claims the benefit of priority from prior Japanese Patent Application No. 2009-113619, filed May 8, 2009, the entire contents of which are incorporated herein by reference.

BACKGROUND OF THE INVENTION

1. Field of the Invention

The present invention relates to a baseplate for a disk drive suspension used in an information processing device, such as a personal computer, and a method for manufacturing the baseplate.

2. Description of the Related Art

A hard disk drive (HDD) is used in an information processing apparatus, such as a personal computer. The hard disk drive comprises a magnetic disk rotatable about a spindle, actuator arm, positioning motor, etc. The actuator arm is moved transversely relative to tracks about a pivot by the positioning motor. A suspension is mounted on the distal end portion of the actuator arm.

The suspension comprises a baseplate (or mount plate), load beam, flexure, etc. The baseplate is fixed to the actuator arm. The load beam is fixed to the baseplate directly or by means of a hinge member. The flexure is located along the load beam. A slider, which constitutes a magnetic head, is disposed on the distal end portion of the flexure. The baseplate is formed of an iron-group metal, such as austenite stainless steel (e.g., SUS304 described later). This baseplate is press-formed into a predetermined shape. An example of a suspension with a baseplate is disclosed in Jpn. Pat. Appln. KOKAI Publication No. 10-31872 (Patent Document 1).

A cylindrical boss portion is formed on the baseplate of the suspension in order to fix the baseplate to the actuator arm. The boss portion is inserted into a circular mounting hole in the actuator arm and fixed to the actuator arm by fixing means. An example of a baseplate with a boss portion is disclosed in Japanese Patent No. 3563037 (Patent Document 2).

Plastic working called "ball caulking" is known as an example of the fixing means. In the ball caulking, a hard ball, such as a steel ball, is passed through the interior of the boss portion to enlarge its diameter. By the ball caulking, the outer peripheral surface of the boss portion is fixed to the inner peripheral surface of the mounting hole in the actuator arm. If the boss portion is press-formed, it may sometimes be work-hardened. In this case, the hardness of the boss portion is reduced by heat treatment before the ball caulking is performed, for example.

It is not automatic that if the hardness of the boss portion is reduced by heat-treating the baseplate as described above, then the coefficient of friction between the ball and the inner surface of the boss portion will be reduced. Therefore, a great ball insertion force may be required in some cases. If the difference between the diameter of the ball and the inside diameter of a ball insertion hole is reduced in order to facilitate the passage of the ball, the required insertion force can be reduced. In that case, however, the diameter of the boss portion cannot be sufficiently enlarged by the ball caulking, so that the strength with which the boss portion is secured to the actuator arm is insufficient.

If the difference between the ball diameter and the inside diameter of the ball insertion hole is increased, on the other hand, the passage of the ball requires too great a force (ball insertion force). Therefore, that area of the baseplate which surrounds the boss portion may be deformed, thereby adversely affecting the properties of the suspension. In order to reduce the frictional resistance produced by the passage of the ball, it is proposed to form a film of, for example, an alcohol-based lubricant on the inner surface of the boss portion. However, this method requires a process for applying the lubricant on the inner surface of the boss portion, process for removing the lubricant, etc., resulting in an undesirable increase in the number of processes.

BRIEF SUMMARY OF THE INVENTION

The present invention provides a baseplate, configured so that the frictional resistance produced by the passage of a ball can be reduced and a boss portion can be firmly secured to an actuator arm, and a method for manufacturing the baseplate.

A baseplate of a suspension is fixed to an actuator arm of a disk drive. The baseplate comprises a cylindrical boss portion configured to be inserted into a mounting hole formed in the actuator arm. The boss portion comprises a ball insertion hole, which penetrates the boss portion along an axis thereof, and a chemically-polished surface formed on an inner circumferential wall of the ball insertion hole.

According to the invention, the chemically-polished surface is formed on the inner circumferential wall of the boss portion of the heat-treated baseplate. When compared to the case of the conventional boss portion that is only heat-treated, therefore, the frictional resistance produced by the passage of a ball can be reduced without the use of a lubricant, and deformation of the area around the boss portion can be suppressed. Since the difference between the inside diameter of the ball insertion hole and the diameter of the ball can be made appropriate, moreover, the boss portion can be firmly secured to the inner peripheral surface of the mounting hole of the actuator arm, based on plastic deformation of the boss portion through which the ball is passed.

Further, the invention provides a method for manufacturing a baseplate comprising a boss portion configured to be inserted into a mounting hole of an actuator arm of a disk drive. The method comprises press-forming the baseplate of stainless steel, thereby forming the boss portion in the shape of a cylinder comprising a ball insertion hole, and work-hardening the boss portion; heat-treating the work-hardened baseplate, thereby reducing the hardness of the boss portion; and immersing the baseplate in a chemical polishing liquid after the heat treatment, thereby forming a chemically-polished surface on an inner circumferential wall of the ball insertion hole.

A method for fixing a disk drive suspension to an actuator arm comprises inserting the boss portion into the mounting hole of the actuator arm and passing the ball having a diameter larger than the inside diameter of the inner circumferential wall through the ball insertion hole of the boss portion, thereby enlarging the diameter of the boss portion to allow the boss portion to be fixed to the actuator arm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will now be described with reference to FIGS. 1 to 10.

Figure 1:
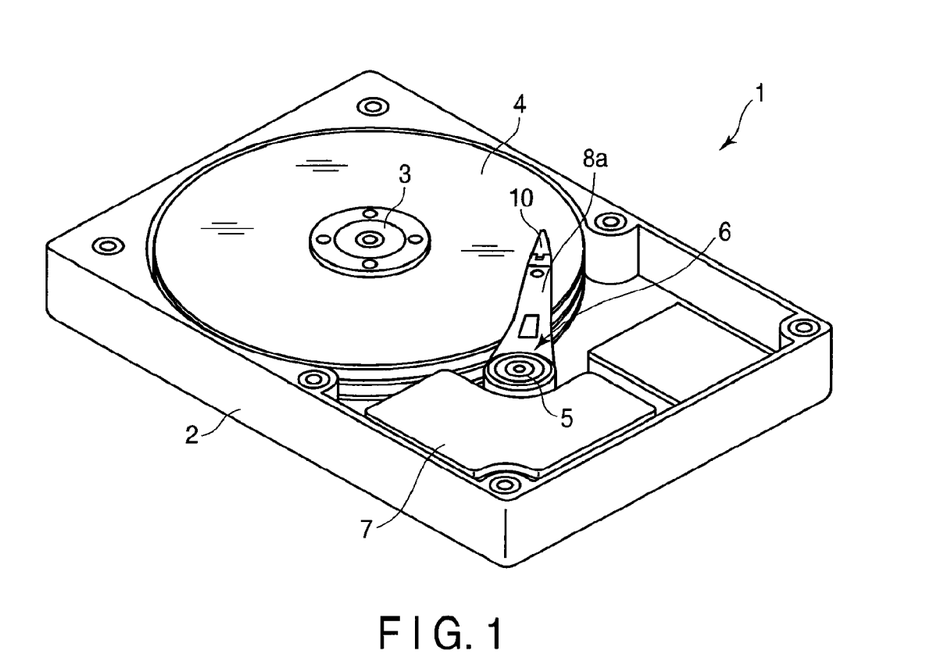
FIG. 1 is a perspective view of a disk drive comprising a disk drive suspension.

A hard disk drive (hereinafter referred to as a "disk drive") 1 shown in FIG. 1 comprises a case 2, disks 4, carriage 6, positioning motor 7, etc. The disks 4 are rotatable about a spindle 3. The carriage 6 is turnable about a pivot 5. The positioning motor 7 turns the carriage 6. The case 2 is covered by a lid (not shown).

Figure 2:
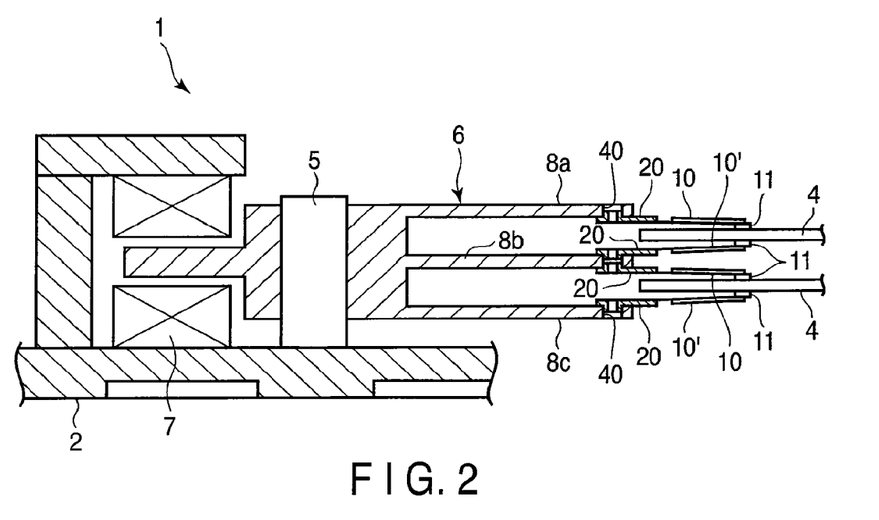
FIG. 2 is a partial sectional view of a disk drive according to one embodiment of the invention.

FIG. 2 is a sectional view typically showing a part of the disk drive 1. As shown in FIG. 2, the carriage 6 comprises a plurality of (e.g., three) actuator arms 8a, 8b and 8c. A first suspension 10 is mounted on each of the respective lower surfaces of the uppermost actuator arm 8a and the vertically middle actuator arm 8b.

Further, a second suspension 10' is mounted on each of the respective upper surfaces of the vertically middle actuator arm 8b and the lowermost actuator arm 8c. A slider 11, which constitutes a magnetic head, is disposed on the distal end of each of the suspensions 10 and 10'.

If the disks 4 rotate at high speed about the spindle 3, an air bearing is formed between each disk 4 and slider 11. Each slider 11 can be moved to a desired track of the disk 4 by turning the carriage 6 by means of the positioning motor 7.

In the example shown in FIG. 2, the slider 11 on each first suspension 10 faces the upper surface of its corresponding disk 4. On the other hand, the slider 11 on each second suspension 10' faces the lower surface of its corresponding disk 4. The first and second suspensions 10 and 10' in each pair are symmetric (mirror-symmetric) with respect to the disk 4. Thus, since the first and second suspensions 10 and 10' have a common basic configuration, the first suspension 10 will now be described as a representative.

Figure 3:
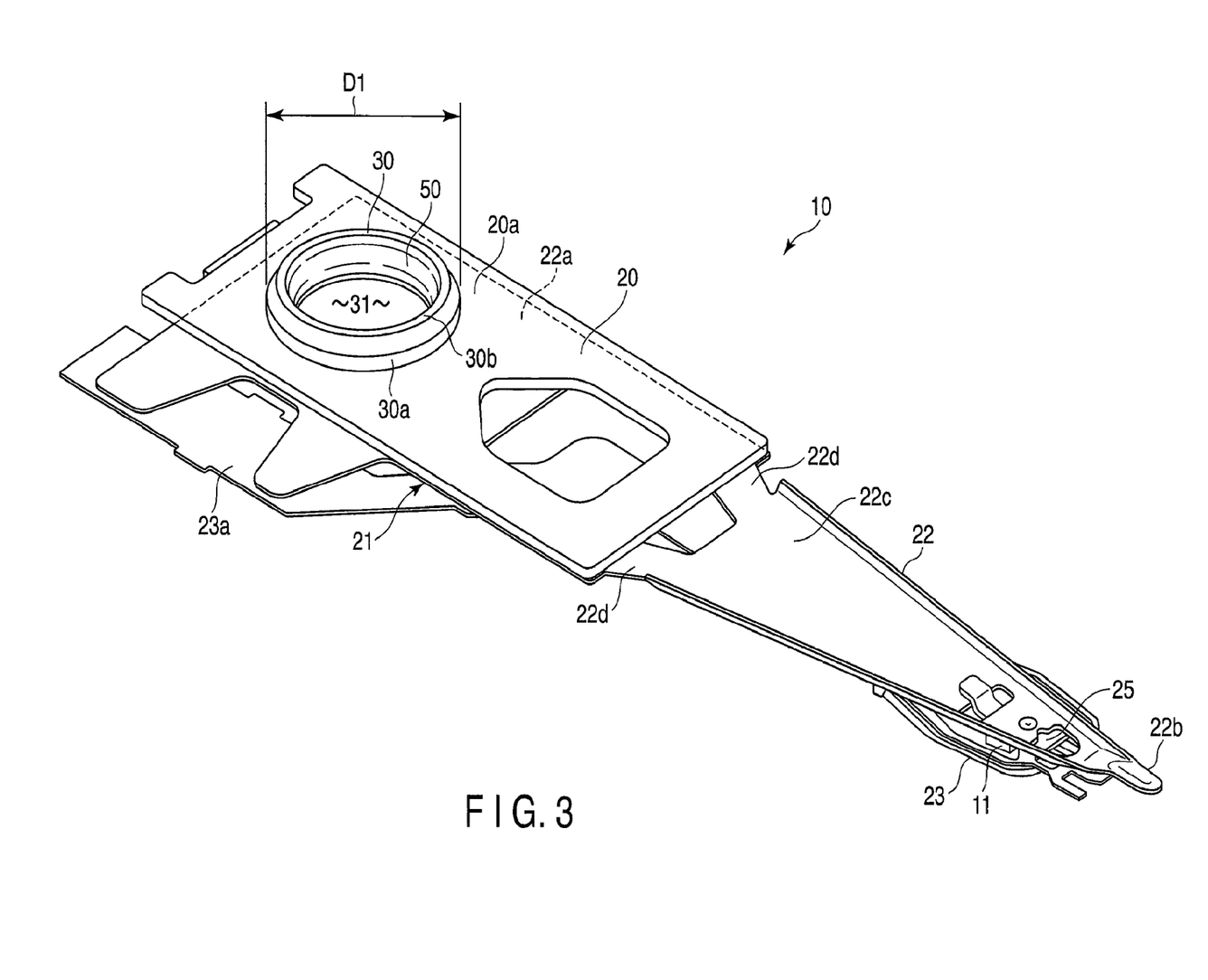
FIG. 3 is a perspective view of a first suspension of the disk drive shown in FIG. 2.

FIG. 3 shows the first suspension 10. This suspension 10 comprises a base portion 21, load beam 22, flexure 23 with conductors, etc. The base portion 21 comprises a baseplate 20. The baseplate 20 will be described in detail later.

The load beam 22 comprises a proximal portion 22a overlapping the baseplate 20, distal end portion 22b, beam portion 22c, hinge portion 22d, etc. The beam portion 22c is located between the proximal portion 22a and distal end portion 22b. The proximal portion 22a of the load beam 22 is fixed to the baseplate 20 by fixing means, such as laser welding. The load beam 22 is about 30 to 100 μm thick.

The flexure 23 is located along the load beam 22. A tongue (gimbal portion) 25 is formed near the distal end of the flexure 23. The slider 11 is mounted on the tongue. The slider 11, which functions as the magnetic head, comprises a reading element and writing element (not shown). As shown in FIG. 3, an extending portion 23a of the flexure 23 extends rearward from one side portion of the baseplate 20.

The baseplate 20 is formed of austenite stainless steel, such as SUS304. The SUS304 is stainless steel prescribed by the Japanese Industrial Standard (JIS). The chemical composition the SUS304 comprises 0.08 or less carbon, 1.00 or less silicon, 2.00 or less manganese, 8.00 to 10.50 nickel, 18.00 to 20.00 chromium, and iron for the remainder. The baseplate 20 is thicker than the load beam 22 and is, for example, about 100 μm thick.

A short cylindrical boss portion 30 is press-formed on the baseplate 20. A ball insertion hole 31 penetrates the boss portion 30 relative to the thickness of the baseplate 20. The boss portion 30 comprises an outer peripheral surface 30a, an end face 30b, and the ball insertion hole 31. The end face 30b of the boss portion 30 projects outward from one surface 20a of the baseplate 20 relative to its thickness.

Figure 4:
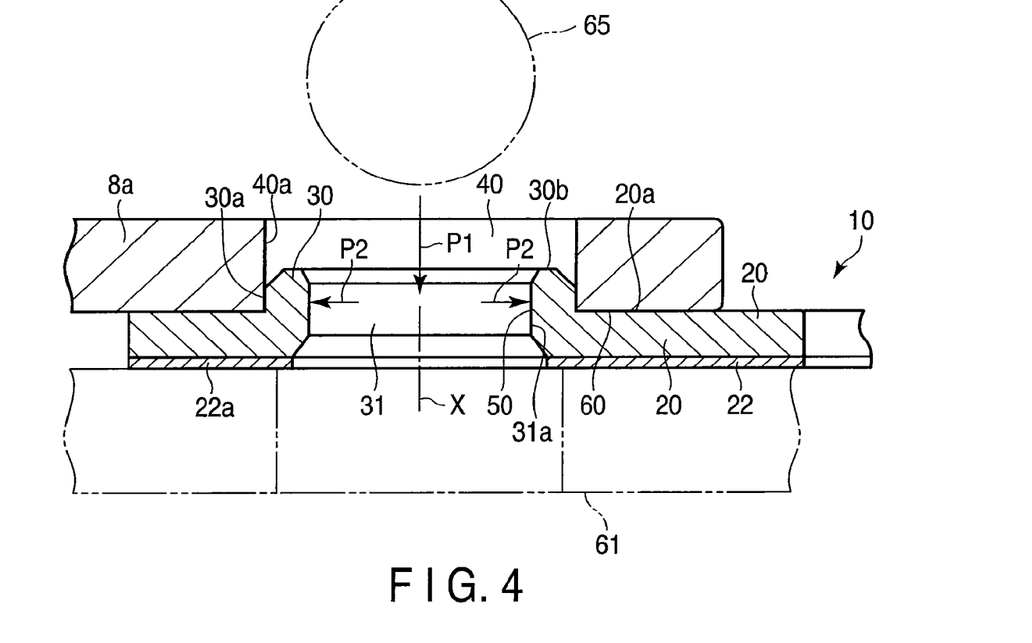
FIG. 4 is a sectional view showing a part of the first suspension and a part of an actuator arm shown in FIG. 2.

As shown in FIG. 2, the first suspension 10 is mounted on each of the respective lower surfaces of the uppermost actuator arm 8a and the vertically middle actuator arm 8b. FIG. 4 shows a part of the actuator arm 8a and a part of the first suspension 10.

Figure 5:
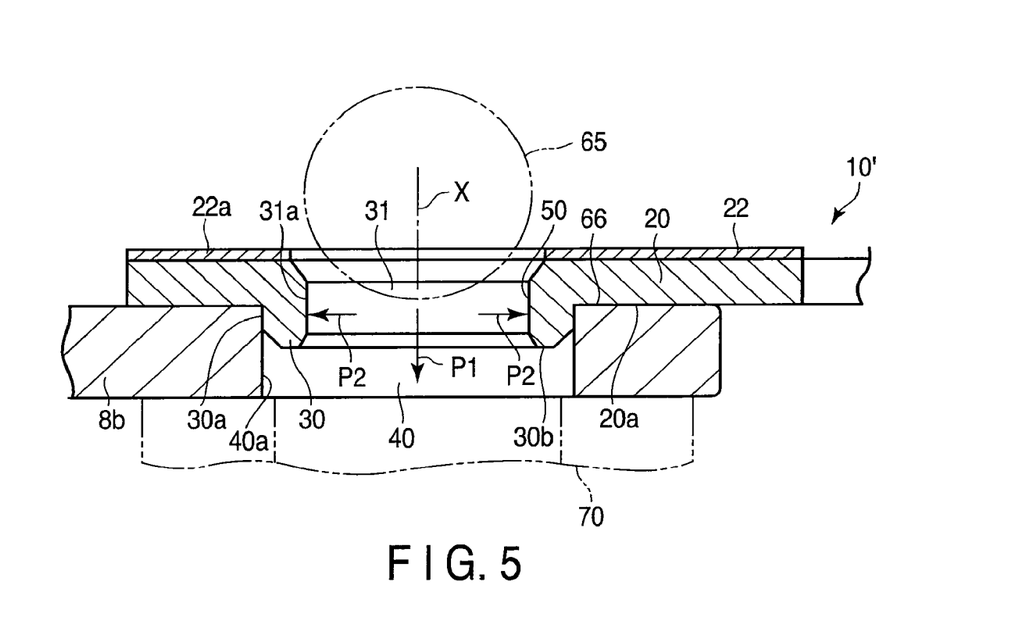
FIG. 5 is a sectional view showing a part of a second suspension and a part of another actuator arm of the disk drive shown in FIG. 2.
Figure 6:
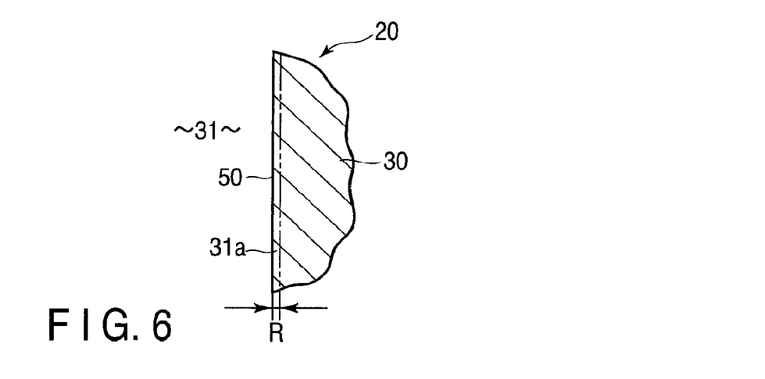
FIG. 6 is an enlarged sectional view typically showing a part of an inner circumferential wall of a boss portion of the first suspension shown in FIG. 3.

Further, the second suspension 10' is mounted on each of the respective upper surfaces of the vertically middle actuator arm 8b and the lowermost actuator arm 8c. FIG. 5 shows a part of the actuator arm 8b and a part of the second suspension 10'. A circular mounting hole 40 is formed in the distal end portion of each of the actuator arms 8a, 8b and 8c. The mounting hole 40 penetrates each actuator arm relative to its thickness.

The boss portion 30 of the baseplate 20 is penetrated by the ball insertion hole 31 relative to its axis X. A chemically-polished surface 50 (typically shown in FIG. 6) is formed on the inner circumferential wall of the boss portion 30, that is, an inner circumferential wall 31a of the ball insertion hole 31, by chemical polishing, which will be described later.

The following is a description of manufacturing processes for the baseplate 20.

In a forming process for forming the baseplate 20 into a predetermined shape, the boss portion 30 and the like are press-formed. The baseplate 20 of austenite stainless steel is liable to work hardening. Therefore, the press-formed boss portion 30 and its surrounding area are work-hardened. As the work hardening is caused by the forming process, moreover, the baseplate 20 suffers a work distortion.

A heat treatment process is performed after the forming process. In this heat treatment process, the baseplate 20 is heated to such a temperature zone that the work distortion can be reduced. Thereafter, the baseplate 20 is annealed. Thus, the hardness of the boss portion 30 can be reduced to a value suitable for the following "ball caulking".

After the heat treatment process is performed, the baseplate 20 is subjected to a chemical polishing process. The chemical polishing process includes degreasing/cleaning, rinsing, acid activation, chemical polishing, hot-water washing, cleaning with pure water, and drying. An example of a chemical polishing liquid is a solution of hydrochloric acid and nitric acid diluted with water. The baseplate 20 is immersed for 30 to 60 seconds in the chemical polishing liquid that is heated to 90 to 100° C. By this chemical polishing process, the chemically-polished surface 50 is formed on the entire baseplate 20 including the inner circumferential wall 31a of the ball insertion hole 31. The depth of removing by the chemical polishing process ranges from, for example, 1 to 3 μm.

Figure 7:
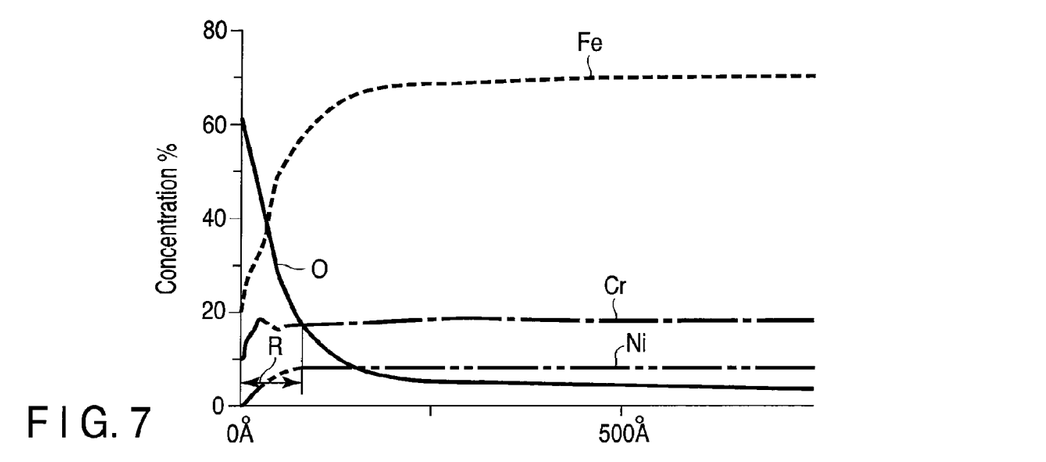
FIG. 7 is a graph showing the atomic concentrations of the inner circumferential wall of the boss portion after heat treatment.

FIG. 7 shows results of inspection of the atomic concentrations of the inner circumferential wall 31a of the boss portion 30 of the heat-treated baseplate 20 using an electron spectroscope for chemical analysis (ESCA). One angstrom (A) is equal to one ten-billionth of a meter. An oxygen-rich layer R of which the oxygen (O) concentration is higher than its chromium (Cr) concentration is formed in the inner circumferential wall 31a of the ball insertion hole 31 of the heat-treated boss portion 30, ranging from the surface of the wall 31a to a relatively deep region. On that surface, moreover, the oxygen concentration is higher than the iron (Fe) concentration.

Figure 8:
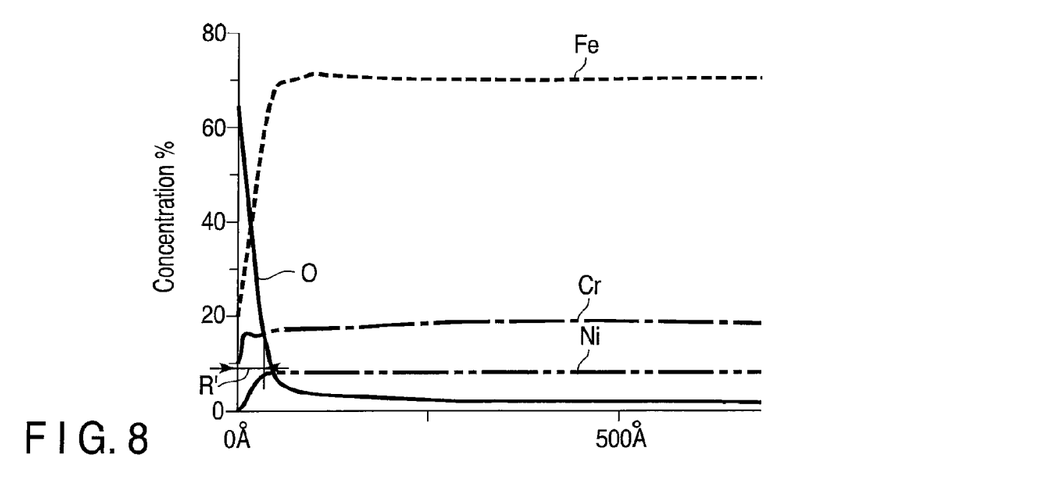
FIG. 8 is a graph showing the atomic concentrations of the inner circumferential wall of the chemically-polished boss portion.

FIG. 8 shows the atomic concentrations of the inner circumferential wall 31a of the chemically-polished boss portion 30. While an oxygen-rich layer R' of which the oxygen (O) concentration is higher than its chromium (Cr) concentration is formed near the surface, the thickness of the oxygen-rich layer R' is reduced compared to that of the oxygen-rich layer R (FIG. 7) before the chemical polishing. Thus, whether or not the chemical polishing is performed can be ascertained by measuring the atomic concentrations of the surface of the baseplate 20 by means of the ESCA.

As shown in FIG. 4, the boss portion 30 of the baseplate 20 of the first suspension 10 is inserted into the mounting hole 40 of the actuator arm 8a. The one surface 20a of the baseplate 20 (from which the boss portion 30 protrudes) is brought into contact with a baseplate mounting surface 60 of the actuator arm 8a. The baseplate 20 is supported by a support member 61.

In this state, a hard ball 65 of steel ball or the like is inserted into the ball insertion hole 31. The ball 65 functions as a caulking jig. The ball 65 is passed through the hole 31 in the direction of arrow P1 with respect to the axis X of the boss portion 30. In this example, the direction of arrow P1 is a direction in which the boss portion 30 is compressed, so that the side indicated by arrow P1 will be referred to as the compression side herein.

Before the ball 65 is passed through the ball insertion hole 31, an outside diameter D1 (FIG. 3) of the boss portion 30 is slightly smaller than the inside diameter of the mounting hole 40. Therefore, the boss portion 30 can be inserted into the hole 40. The ball 65 is formed of a metal harder than the boss portion 30, and the diameter of the ball 65 is larger than the inside diameter of the ball insertion hole 31.

If the ball 65 is passed through the ball insertion hole 31, therefore, the boss portion 30 is plastically deformed so that its diameter is enlarged, as indicated by arrow P2 in FIG. 4. Thereupon, the outer peripheral surface 30a of the boss portion 30 is fixed to an inner peripheral surface 40a of the mounting hole 40 of the actuator arm 8a. Thus, the boss portion 30 of the first suspension 10 is fixed to the lower surface of the actuator arm 8a by "ball caulking".

As shown in FIG. 5, the boss portion 30 of the baseplate 20 of the second suspension 10' is inserted into the mounting hole 40 of the actuator arm 8b. The one surface 20a of the baseplate 20 (from which the boss portion 30 protrudes) is brought into contact with a baseplate mounting surface 66 of the actuator arm 8b. The baseplate 20 and actuator arm 8b are supported by a support member 70.

In this state, the ball 65 is passed through the ball insertion hole 31 in the direction of arrow P1 with respect to the axis X. In this case, the direction of arrow P1 is a direction in which the boss portion 30 is pulled, so that the side indicated by arrow P1 will be referred to as the tension side herein. Thus, the second suspension 10' is fixed to the upper surface of the actuator arm 8b by "ball caulking", as in the case of the first suspension 10. Like those suspensions 10 and 10', the suspension 10 mounted on the lower surface of the actuator arm 8b and the suspension 10' mounted on the upper surface of the actuator arm 8c are fixed to the arms 8b and 8c, respectively.

Figure 9:
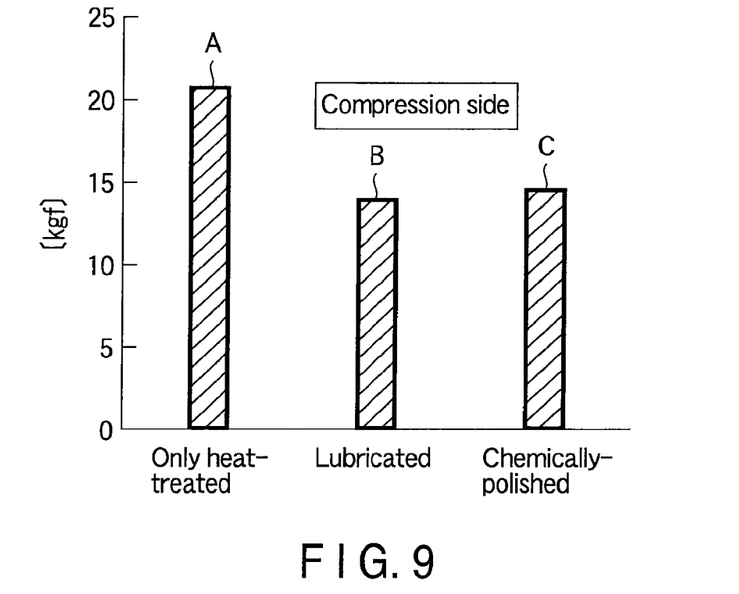
FIG. 9 is a graph showing the magnitude of resistivity at which a ball is passed through the boss portion of each of three types of baseplates from a compression side.

FIG. 9 shows the magnitude of resistivity (ball insertion force) at which the ball 65 is passed through the boss portion 30 of each of three types of baseplates from the compression side (FIG. 4). In FIG. 9, symbol A represents the resistivity of the boss portion of a baseplate that is subjected to heat treatment only. Symbol B in FIG. 9 represents the resistivity of the boss portion of a baseplate coated with a lubricant. Symbol C in FIG. 9 represents the resistivity of the boss portion of a baseplate that is chemically polished after being heat-treated.

The inner circumferential wall 31a of the boss portion 30 according to the present embodiment is chemically polished. Therefore, the hard oxygen-rich layer R' (FIG. 8) is thinner than the oxygen-rich layer R (FIG. 7) that is not chemically polished yet. Since the oxygen-rich layer R', which is hard and slippery, although thin, remains on the inner circumferential wall 31a of the ball insertion hole 31, the ball 65 easily slides.

As represented by symbol C in FIG. 9, therefore, the resistivity at which the ball 65 is passed through the boss portion 30 according to the present embodiment is considerably reduced compared to the case of the only heat-treated boss portion (represented by symbol A). Accordingly, the diameter of the boss portion 30 can be enlarged with a relatively small ball insertion force, and the boss portion 30 can be firmly secured to the actuator arm.

Thus, the chemically-polished surface 50 is formed on the inner circumferential wall 31a of the ball insertion hole 31 of the boss portion 30 according to the present embodiment. By means of this polished surface 50, the resistivity at which the ball 65 is passed can be reduced without the use of a lubricant, compared to the case of the conventional boss portion that is only heat-treated. Since the passage of the ball 65 is facilitated, moreover, deformation of the area around the boss portion 30 can be suppressed. Further, the difference between the inside diameter of the ball insertion hole 31 and the diameter of the ball 65 can be made appropriate. Thus, the boss portion 30 can be firmly secured to the inner peripheral surface 40a of the mounting hole 40 of the actuator arm, based on the plastic deformation of the boss portion 30 through which the ball 65 is passed.

Figure 10:
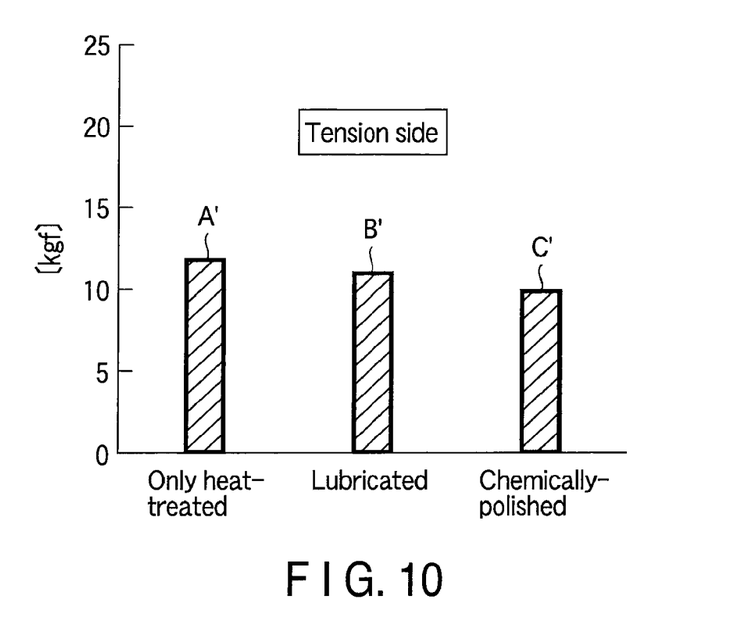
FIG. 10 is a graph showing the magnitude of resistivity at which the ball is passed through the boss portion of each of the three types of baseplates from a tension side.

FIG. 10 shows the magnitude of resistivity at which the ball 65 is passed through the boss portion 30 of each of the three types of baseplates from the tension side (FIG. 5). In FIG. 10, symbol A' represents the resistivity of the boss portion of the baseplate that is subjected to heat treatment only. Symbol B' in FIG. 10 represents the resistivity of the boss portion of the baseplate coated with the lubricant. Symbol C' in FIG. 10 represents the resistivity of the boss portion of the baseplate that is chemically polished after being heat-treated. The resistivity values A', B' and C' are smaller than the resistivity values A, B and C (FIG. 9) with which the ball is passed from the compression side.

If the ball 65 is passed from the tension side of the boss portion 30, as shown in FIG. 5, the ball insertion force acts in a direction such that the boss portion 30 is extended along the axis X. Therefore, the insertion resistance of the ball 65 can be lower than in the case where the ball 65 is passed from the compression side (FIG. 4). Thus, the chemical polishing can be omitted if the ball 65 is passed from the tension side of the boss portion 30, as in the case of the second suspension 10'.

In an example of an assembly structure, the first suspension 10 is mounted on the one surface of the actuator arm, and the second suspension 10' on the other surface. In this case, the structure may be arranged so that the chemically-polished surface 50 is formed on the inner circumferential wall 31a of the ball insertion hole 31 of the baseplate 20 of the first suspension 10, and not on that of the second suspension 10'. According to the assembly structure arranged in this manner, the baseplate 20 of the second suspension 10' does not require use of the chemically-polished surface 50, so that the manufacturing cost can be reduced.

It is to be understood, in carrying out the present invention, that the processes for heat treatment, chemical polishing, etc., as well as the specific shapes and structures of the boss portion of each baseplate and actuator arms, may be embodied in various forms without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A baseplate of a suspension fixed to an actuator arm of a disk drive, the baseplate being formed from heat-treated austenite stainless steel and comprising a cylindrical boss portion configured to be inserted into a mounting hole formed in the actuator arm, wherein:

the boss portion comprises a ball insertion hole, which penetrates the boss portion along an axis thereof, and a chemically-polished surface formed on an inner circumferential wall of the ball insertion hole, the chemically-polished surface has an oxygen-rich layer of which an oxygen concentration is higher than a chromium concentration near a surface, a thickness of the oxygen-rich layer is thinner than a thickness of an oxygen-rich layer of a non-chemically polished surface, and a frictional resistance when a ball is inserted in a direction in which the boss portion is pulled is smaller than a frictional resistance when the ball is inserted in a direction in which the boss portion is compressed.

* * * * *